United States Patent
Hwang et al.

(10) Patent No.: US 10,962,785 B2
(45) Date of Patent: Mar. 30, 2021

(54) ELECTRONIC DEVICE, MOBILE ELECTRONIC DEVICE, AND DISPLAY DEVICE, WHICH ARE CONTROLLED ON BASIS OF USER GAZE AND INPUT

(71) Applicant: Samsung Electronics Co., Ltd., Gyeonggi-do (KR)

(72) Inventors: Sang Woong Hwang, Gyeonggi-do (KR); Young Ah Seong, Seoul (KR); Say Jang, Gyeonggi-do (KR); Seung Hwan Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/465,239

(22) PCT Filed: Dec. 18, 2017

(86) PCT No.: PCT/KR2017/014912
§ 371 (c)(1),
(2) Date: May 30, 2019

(87) PCT Pub. No.: WO2018/117560
PCT Pub. Date: Jun. 28, 2018

(65) Prior Publication Data
US 2019/0324279 A1  Oct. 24, 2019

(30) Foreign Application Priority Data
Dec. 19, 2016  (KR) .................... 10-2016-0173893

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G06F 3/16* (2013.01);
(Continued)

(58) Field of Classification Search
CPC ........ G02B 27/0172; G02B 2027/0138; G02B 2027/014; G02B 2027/0187; G06F 3/013; G06F 3/16; H04N 21/4126
(Continued)

(56) References Cited

U.S. PATENT DOCUMENTS 9,524,023 B2  12/2016 Ahn et al.
10,114,463 B2  10/2018 Cheon et al.
(Continued)

FOREIGN PATENT DOCUMENTS

KR  10-2014-0050484 A  4/2014
KR  10-2014-0073730 A  6/2014
(Continued)

*Primary Examiner* — Chanh D Nguyen
*Assistant Examiner* — Ngan T. Pham-Lu
(74) *Attorney, Agent, or Firm* — Cha & Reiter, LLC.

(57) ABSTRACT

An electronic device is disclosed. The electronic device comprises a first camera and a second camera, a microphone, a display, and a processor electrically connected to the first camera, the second camera, the microphone, and the display, wherein the processor can be set to display, on the display, a user interface (UI) including a plurality of objects, acquire user gaze information from the first camera, activate, among the plurality of objects, a first object corresponding to the gaze information, determine at least one method of input, corresponding to a type of the activated first object, between a gesture input acquired from the second camera and a voice input acquired by the microphone, and execute the function corresponding to the input for the first object While an activated state of the first object is maintained, if the input of the determined method is applicable to the first
(Continued)

object. In addition, various embodiments identified through the specification are possible.

13 Claims, 22 Drawing Sheets

(51) Int. Cl.
  *G06F 3/16* (2006.01)
  *H04N 21/41* (2011.01)
(52) U.S. Cl.
  CPC ... *H04N 21/4126* (2013.01); *G02B 2027/014* (2013.01); *G02B 2027/0138* (2013.01); *G02B 2027/0187* (2013.01)
(58) Field of Classification Search
  USPC .............................................................. 345/8
  See application file for complete search history.

(56) References Cited

U.S. PATENT DOCUMENTS

| | | |
|---|---|---|
| 10,248,192 B2 | 4/2019 | Lehman et al. |
| 2014/0111420 A1 | 4/2014 | Ahn et al. |
| 2014/0164928 A1* | 6/2014 | Kim ................. G06F 3/017 715/728 |
| 2015/0058790 A1 | 2/2015 | Kim et al. |
| 2015/0309316 A1 | 10/2015 | Osterhout et al. |
| 2016/0091967 A1 | 3/2016 | Prokofieva et al. |
| 2016/0098093 A1* | 4/2016 | Cheon .............. G06F 3/0484 345/156 |
| 2016/0124706 A1* | 5/2016 | Vasilieff ............ G10L 15/22 704/275 |
| 2016/0162020 A1* | 6/2016 | Lehman ............. G06F 3/013 |
| 2017/0060370 A1 | 3/2017 | Ahn et al. |
| 2017/0168566 A1 | 6/2017 | Osterhout et al. |
| 2017/0199543 A1 | 7/2017 | Rhee et al. |
| 2017/0344114 A1 | 11/2017 | Osterhout et al. |

FOREIGN PATENT DOCUMENTS

| | | |
|---|---|---|
| KR | 10-2015-0023151 A | 3/2015 |
| KR | 10-2015-0087909 A | 7/2015 |
| KR | 10-2016-0001465 A | 1/2016 |
| KR | 10-2016-0039499 A | 4/2016 |
| KR | 10-1657947 B1 | 9/2019 |

* cited by examiner

ELECTRONIC DEVICE, MOBILE ELECTRONIC DEVICE, AND DISPLAY DEVICE, WHICH ARE CONTROLLED ON BASIS OF USER GAZE AND INPUT

CLAIM OF PRIORITY

This application is a National Phase Entry of PCT International Application No. PCT/KR2017/014912, which was filed on Dec. 18, 2017 and claims a priority to Korean Patent Application No. 10-2016-0173893, which was filed on Dec. 19, 2016, the contents of which are incorporated herein by reference.

TECHNICAL FIELD

Embodiments of the disclosure relate to an electronic device, a mobile electronic device, and a display device which are controlled based on a user's gaze and input.

BACKGROUND ART

With the development of new intelligent devices such as wearable products, various input methods for devices have also been developed. Especially, as the artificial intelligence begins to be attracted to attention, speech input is attracting attention as an interface to replace touch input, and input methods utilizing an eyegazing utilizing human gaze and motion detection recognizing a gesture have been also developed.

DISCLOSURE

Technical Problem

In recent years, an electronic device using a combination of two or more input methods such as gaze information, speech input, or gesture input has been proposed, but such an electronic device merely uses multiple input methods at the same time, and therefore, there is a problem in that the amount of computation of the processor is increased, which is inefficient.

Embodiments disclosed in the disclosure may provide an electronic device more efficiently using a user's gaze, a speech input, and a gesture input by determining an input method according to a type of an object of a UI, to solve the above problems and the problems raised in the disclosure.

Technical Solution

According to an embodiment disclosed in the disclosure, an electronic device may include a first camera and a second camera, a microphone, a display, and a processor electrically connected to the first camera, the second camera, the microphone, and the display, wherein the processor displays a user interface (UI) including a plurality of objects on the display, obtains gaze information of a user from the first camera, activates a first object corresponding to the gaze information among the plurality of objects, determines at least one input method corresponding to a type of the activated first object among a gesture input obtained from the second camera and a speech input obtained by the microphone, and performs a function corresponding to an input on the first object while an activated state of the first object is maintained when the input by the determined method is applicable to the first object.

According to an embodiment disclosed in the disclosure, a mobile electronic device coupled to a head mounted display (HMD) including a first camera and a microphone may include a second camera, a display, and a processor functionally connected to the first camera and the microphone and electrically connected to the second camera and the display, wherein the processor displays a user interface (UI) including a plurality of objects on the display, obtains gaze information of a user from the first camera, activates a first object corresponding to the gaze information among the plurality of objects, determines at least one input method corresponding to a type of the activated first object among a gesture input obtained from the second camera and a speech input obtained by the microphone, and performs a function corresponding to an input on the first object while an activated state of the first object is maintained when the input by the determined method is applicable to the first object.

According to an embodiment disclosed in the disclosure, a display device may include a camera, a microphone, a display, and a processor electrically connected to the camera, the microphone, and the display, wherein the processor displays a user interface (UI) including a plurality of objects on the display, obtains gaze information of a user from the camera, activates a first object corresponding to the gaze information among the plurality of objects, determines at least one input method corresponding to a type of the activated first object among a gesture input obtained from the camera and a speech input obtained by the microphone, and performs a function corresponding to an input on the first object while an activated state of the first object is maintained when the input by the determined method is applicable to the first object.

Advantageous Effects

According to embodiments disclosed in the disclosure, it is possible to efficiently and conveniently control an electronic device through a user's gaze and gesture.

In addition, various effects understood directly or indirectly through the disclosure may be provided.

MODE FOR INVENTION

Figure 1:
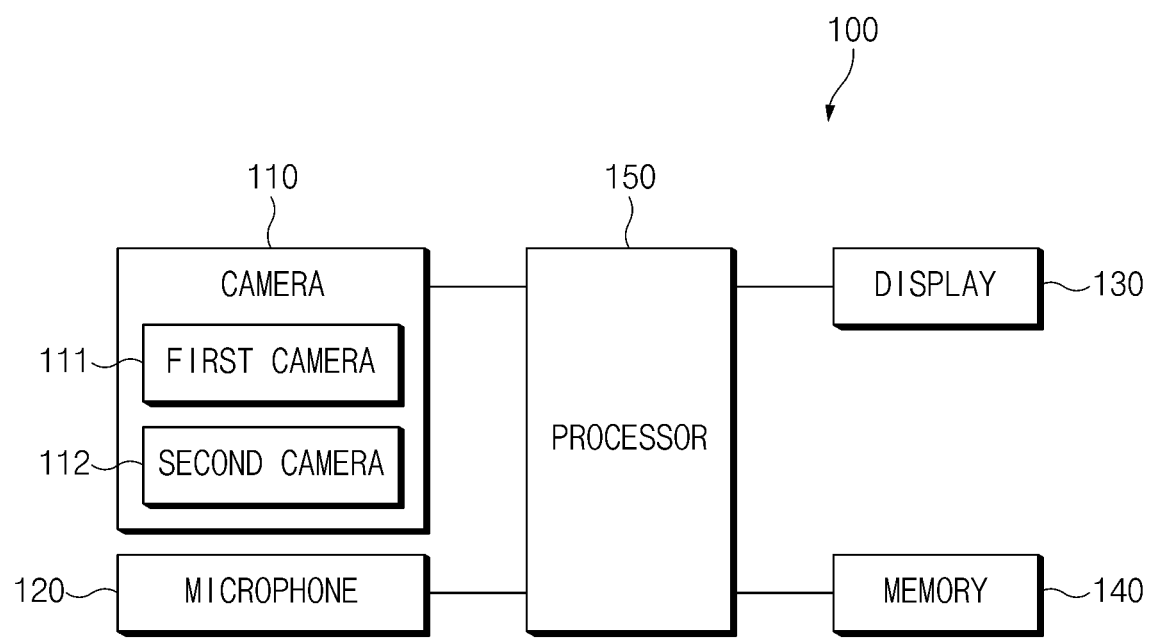
FIG. 1 is a block diagram of an electronic device controlled based on a user's gaze and input according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram of an electronic device controlled based on a user's gaze and input according to an embodiment.

Referring to FIG. 1, an electronic device may include a camera 110, a microphone 120, a display 130, a memory 140, and a processor 150. In various embodiments, the electronic device may omit some of the above components, or may additionally include other components. For example, a configuration such as various types of sensors, a battery, or input/output interfaces may be additionally included in the electronic device.

The camera 110 may photograph a user and obtain gaze information and a gesture input of a user. At least two cameras 110 may be provided, and a first camera 111 may obtain a position to which the gaze of the user is located by photographing the user's eyes. The first camera 111 may correspond to an infra-red camera 110. A second camera 112 may obtain a gesture input by photographing the user's hand or arm motion or the like.

The microphone 120 may obtain a sound signal such as a speech input of the user.

The display 130 may display a user interface (UI) including a plurality of objects under the control of the processor 150.

The memory 140 may include a volatile and/or non-volatile memory 140. The memory 140 may store instructions or data related to components of the electronic device. For example, the memory 140 may store data such as an input method corresponding to a type of an object displayed on the display 130 or a function to be performed on an object of a UI according to an input.

The processor 150 may control other components electrically or functionally connected to the processor 150 in the electronic device and perform operations.

Operations performed by the processor 150 of the electronic device that is controlled based on the user's gaze and input will be described below with reference to FIGS. 2 to 4c.

Figure 2:
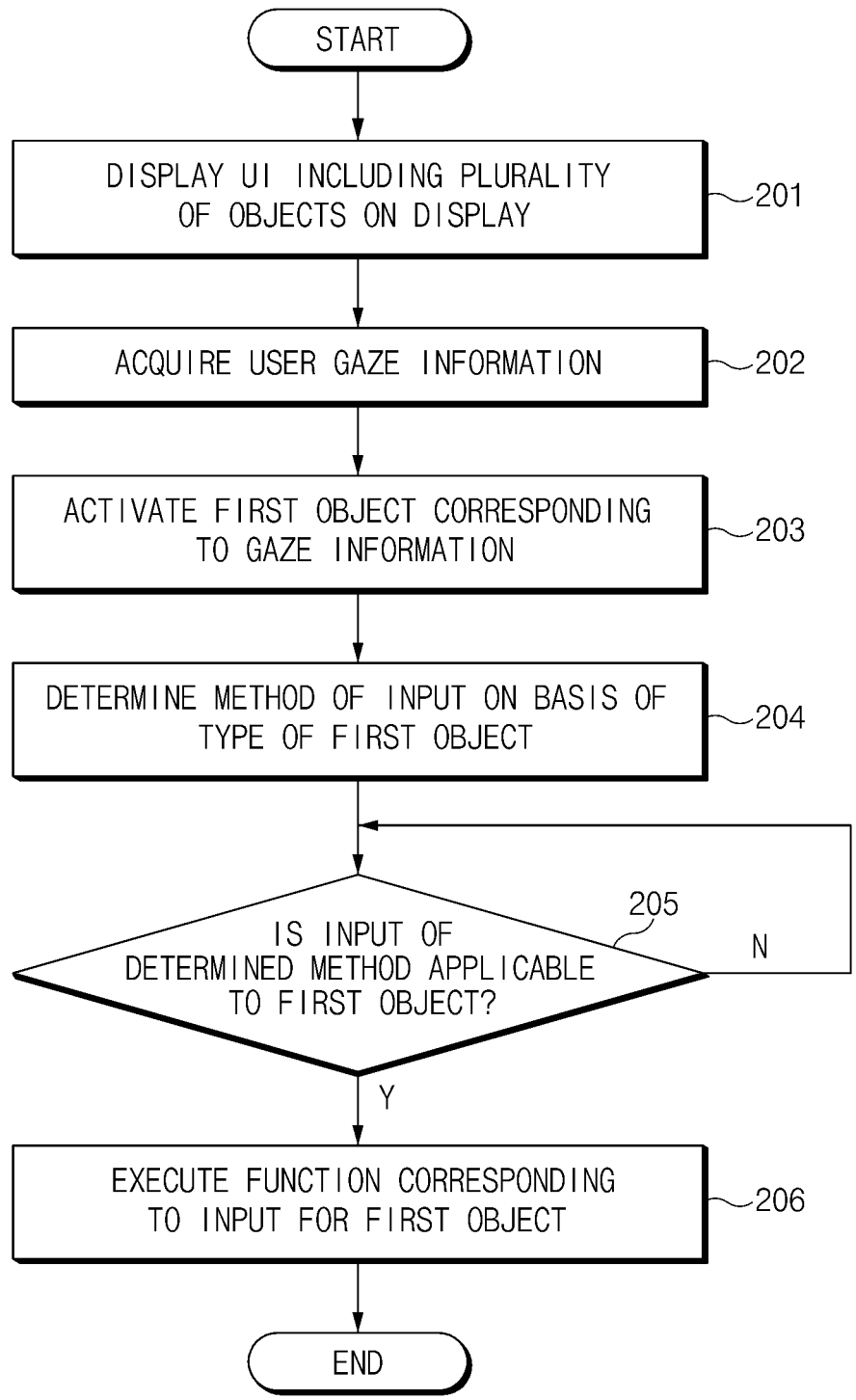
FIG. 2 is an exemplary flowchart for performing a function corresponding to a user's gaze and input in a processor of an electronic device according to an embodiment.

FIG. 2 is an exemplary step-by-step flowchart of performing a function corresponding to a user's gaze and input in the processor 150 of the electronic device according to an embodiment.

Figure 3A:
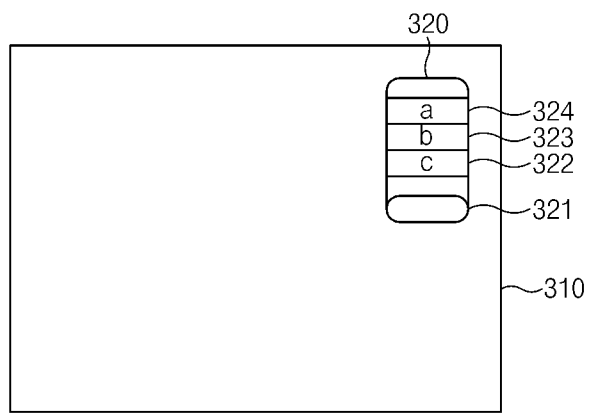
FIG. 3a is a diagram illustrating that an User Interface (UI) including a plurality of objects is displayed on a display, according to an embodiment.
Figure 3B:
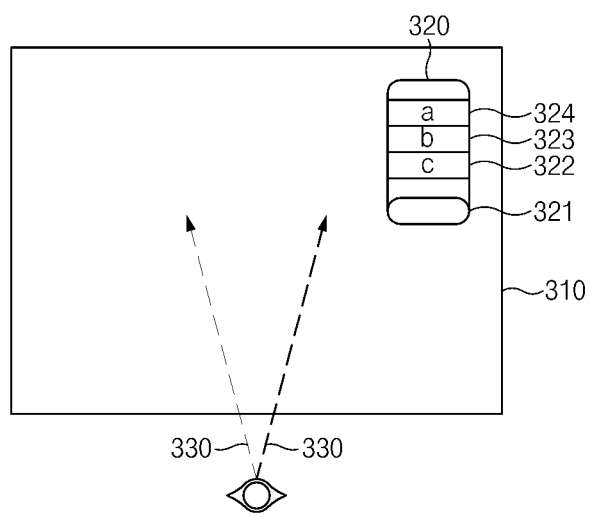
FIG. 3b is a diagram illustrating a position to which gaze of a user is located, according to an embodiment.
Figure 3C:
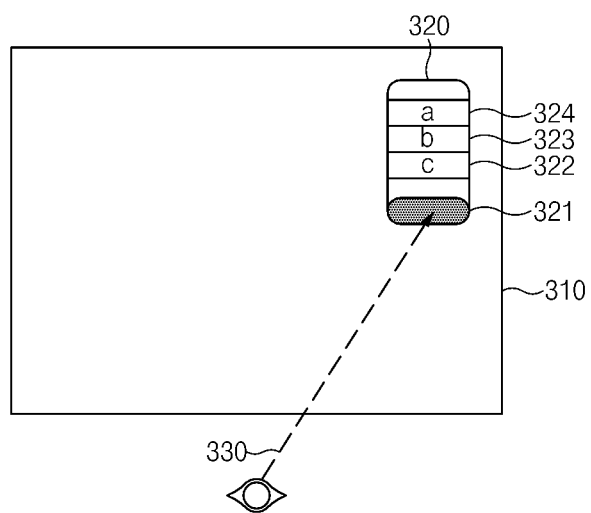
FIG. 3c is a diagram illustrating that an object corresponding to gaze information is activated, according to an embodiment.
Figure 3D:
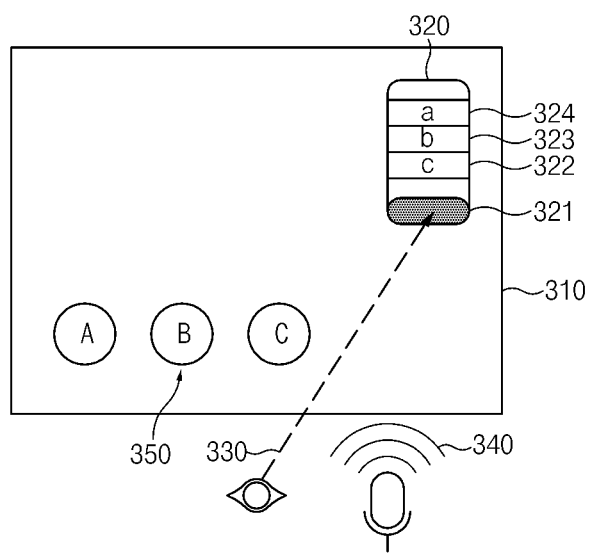
FIG. 3d is a diagram illustrating that a function corresponding to a speech input is performed on an activated object according to an embodiment.
Figure 3E:
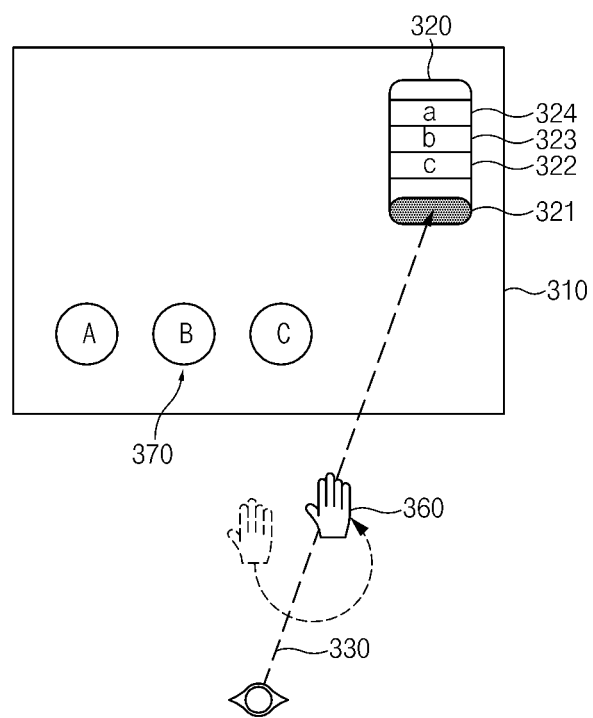
FIG. 3e is a diagram illustrating that a function corresponding to a speech input is performed on an activated object according to an embodiment.

FIG. 3a is a diagram illustrating that a UI including a plurality of objects is displayed on the display 130, according to an embodiment, FIG. 3b is a diagram illustrating a position to which the gaze of the user is located, according to an embodiment, FIG. 3c is a diagram illustrating that an object corresponding to gaze information is activated, according to an embodiment, FIG. 3d is a diagram illustrating that a function corresponding to a speech input is performed on an activated object according to an embodiment, and FIG. 3e is a diagram illustrating that a function corresponding to a speech input is performed on an activated object according to an embodiment. A display 310 in FIGS. 3a to 3e may correspond to the display 130 in FIG. 1.

Referring to FIG. 2, in operation 201, the processor 150 may display a UI including a plurality of objects on the display 130. For example, as in FIG. 3a, the processor 150 may display a UI 320 including a plurality of objects 321 to 324 on the display 130. In FIG. 3a, item objects 322 to 324 of the plurality of objects may correspond to items of a list included in the UI 320, and an execution input receiving object 321 may be an object that receives a command input for instructing separate information corresponding to second objects 322 to 324 to be displayed.

According to an embodiment, the UI may be displayed according to at least one of a speech input and a gesture input. For example, when the user inputs a friend's name through input of speech, the processor 150 may display a UI including the friend's name as an object.

In operation 202, the processor 150 may obtain gaze information of a user from the first camera 111. For example, the processor 150 may, as illustrated in FIG. 3b, obtain gaze information corresponding to which position of the display 130 the gaze of the user is located.

In operation 203, the processor 150 may activate a first object corresponding to the gaze information among a plurality of objects. For example, as illustrated in FIG. 3c, the execution input receiving object 321 to which the gaze of the user 330 is located among the plurality of objects 321 to 324 may correspond to the first object and the processor 150 may activate the execution input receiving object 321. The activated object 321 may be a target on which a function corresponding to at least one of a gesture input and a speech input is to be performed as described below.

According to an embodiment, the processor 150 may activate the first object immediately when the gaze of the user is located at a position where the first object is displayed. Such an activation method may be used in a UI where immediate reactivity is important, such as a UI in which one object is selected from a list including a plurality of objects.

According to an embodiment, the processor 150 may activate the first object when the user's gaze are kept on the position where the first object is displayed, for a predetermined time or more. Such an activation method may be used in a UI where correct selection of the first object is more important than responsiveness to gaze, such as a UI including an object that is displayed small on the display 130.

In operation 240, the processor 150 may determine at least one input method corresponding to a type of the activated first object among a gesture input obtained from the second camera 112 and a speech input obtained by the microphone 120.

For example, when the first object is an object of a character input type, such as a text window or a chatting window, the processor 150 may determine the input method to be the speech input. The processor 150 is capable of receiving a character input through a soft input panel displayed on the display 130 and therefore, when the first object is an object of the character input type, the processor 150 may determine the input method to be the gesture input.

In an embodiment, when the first object is an object of a selection input type, such as an item included in a list or a check box, the processor 150 may determine the input method to be the gesture input.

In an embodiment, when the first object is an object of an operation input type, such as a scroll bar or a slide bar, the processor 150 may determine the input method to be the gesture input.

In an embodiment, when the first object is an object of an execution input type that performs a specific function, the processor 150 may determine one of the speech input and the gesture input as the input method, or may determine both the speech input and the gesture input as the input method.

In FIG. 3c, because the first object 321 is an object of the execution input type, the processor 150 may determine both the speech input and the gesture input as the input method.

According to an embodiment, the processor 150 may determine the input method further based on at least one of the gesture input and the speech input in addition to gaze information.

For example, the processor 150 may determine the input method to be the gesture input when a noise above a reference value occurs in the speech input. In addition, when the gesture input is a gesture of waving a hand, the input method may be determined to be the gesture input.

In operation 205, the processor 150 may determine whether an input by the determined method is applicable to the first object. For example, when the determined input method is the speech input and the speech input applicable to the first object is set to "OK" or "Do it", the processor 150 may determine whether the speech input obtained by the microphone 120 corresponds to one of "OK" and "Do it". In an embodiment, when the determined input method is the gesture input and the gesture input applicable to the first object is set to a gesture of drawing O, the processor 150 may determine whether the gesture input obtained from the second camera 112 corresponds to the gesture of drawing O.

The processor 150 may perform operation 206 when the input by the determined method is applicable to the first object.

When it is determined that the input by the determined method is not applicable to the first object in operation 205, the processor 150 may again determine whether a new input is an input applicable to the first object because the gesture input from the second camera 112 and the voice input from the microphone 120 are capable of being continuously obtained.

In operation 206, the processor 150 may perform a function corresponding to the input by the determined method on the first object while the activated state of the first object is being maintained.

For example, as illustrated in FIG. 3d, the activated state of the execution input receiving object 321 may be maintained because the gaze of the user 330 is located at the execution input receiving object 321, and the processor 150 may perform a function of displaying separate information 350 corresponding to the second objects 322 to 324 on the first object in response to a speech input 340. (It is assumed that, in FIG. 3d, the input by the determined method is the speech input or both the speech input and the gesture input, and the speech input 340 obtained is an input applicable to the execution input receiving object 321.)

In an embodiment, as illustrated in FIG. 3e, the activated state of the execution input receiving object 321 may be maintained because the gaze of the user 330 is located at the execution input receiving object 321, and the processor 150 may perform a function of displaying separate information 370 corresponding to the second objects 322 to 324 on the first object in response to a gesture input 360. (It is assumed that, in FIG. 3e, the input by the determined method is the gesture input or both the speech input and the gesture input, and the gesture input obtained is an input applicable to the execution input receiving object 321.)

According to an embodiment, the processor 150 may perform a function corresponding to the gesture input on the first object when a gesture by the gesture input passes by the gaze of the user.

A method of maintaining the activated state of the first object further based on obtaining of an input by a determined method in addition to gaze information in the processor 150 after operation 204 according to an embodiment is described with reference to FIGS. 4a to 4c.

Figure 4A:
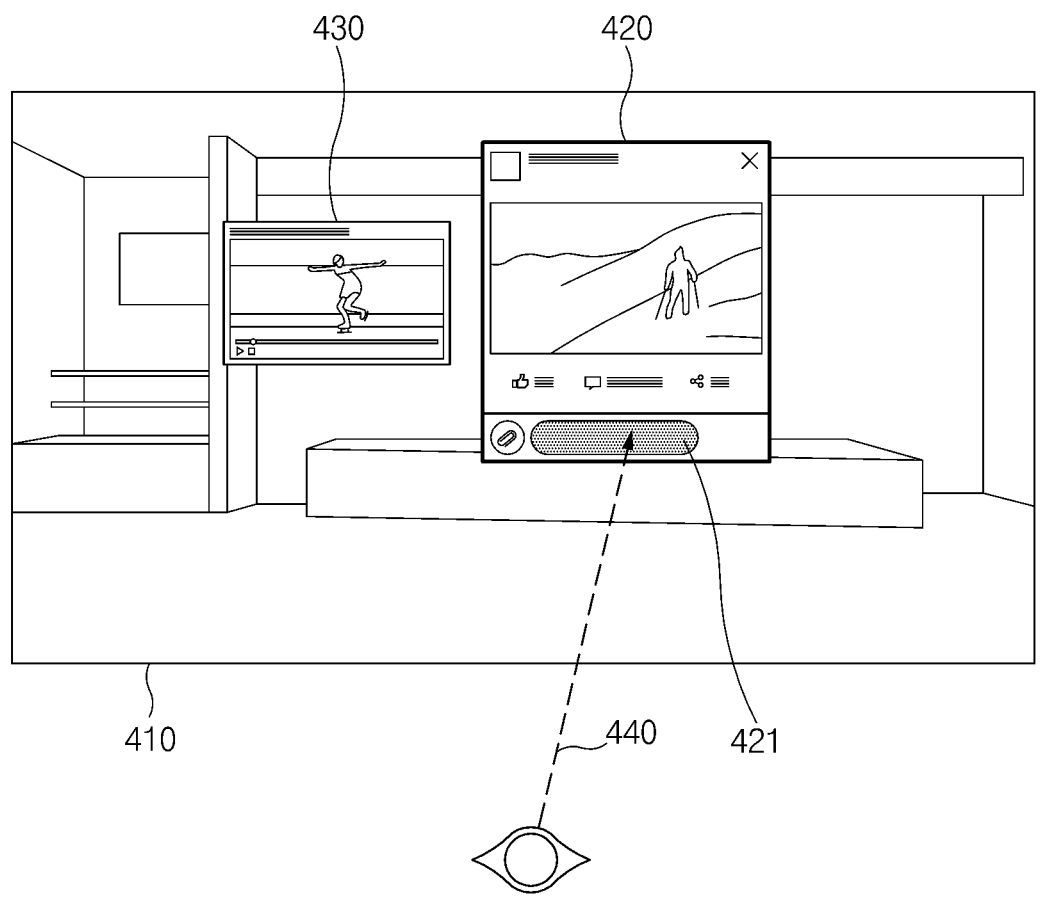
FIG. 4a is a diagram illustrating a screen on which a plurality of objects are displayed in a display according to an embodiment.
Figure 4B:
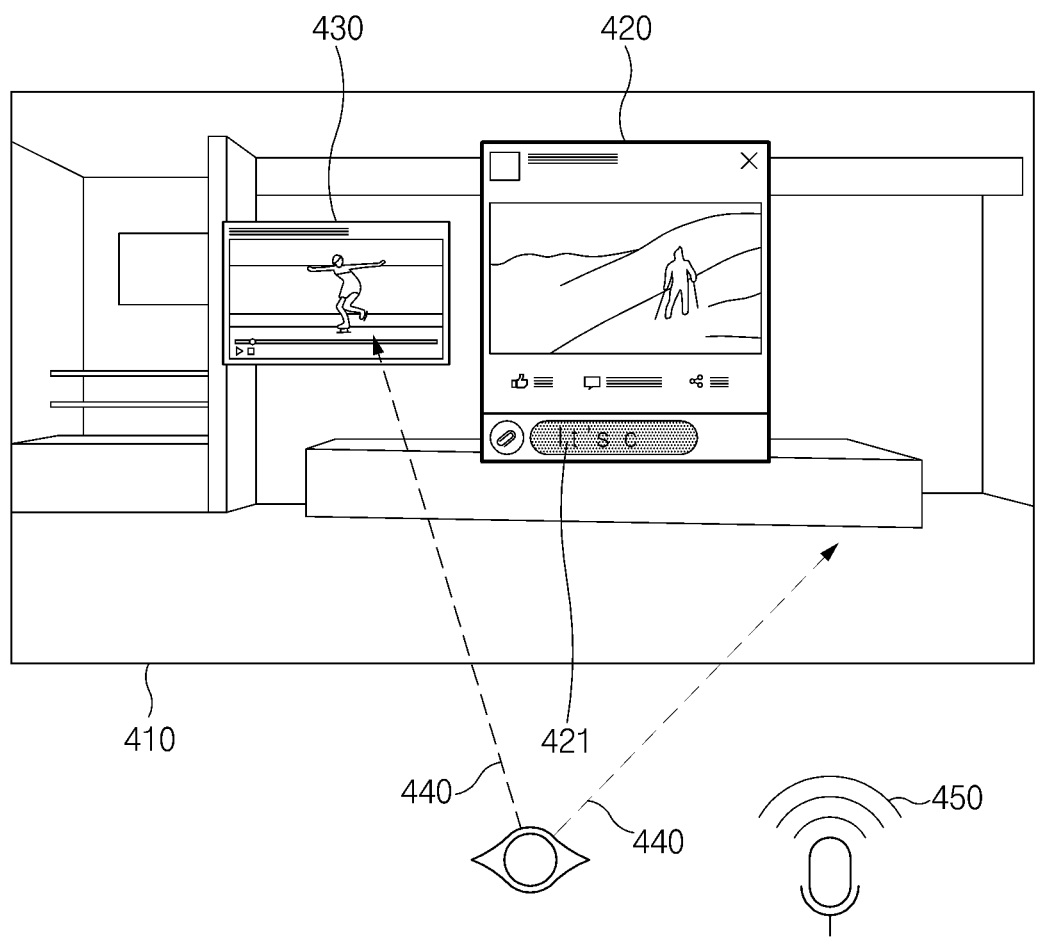
FIG. 4b is a diagram illustrating that text is input to a text input window through a speech input when the gaze of the user is being located at a second object according to an embodiment.
Figure 4C:
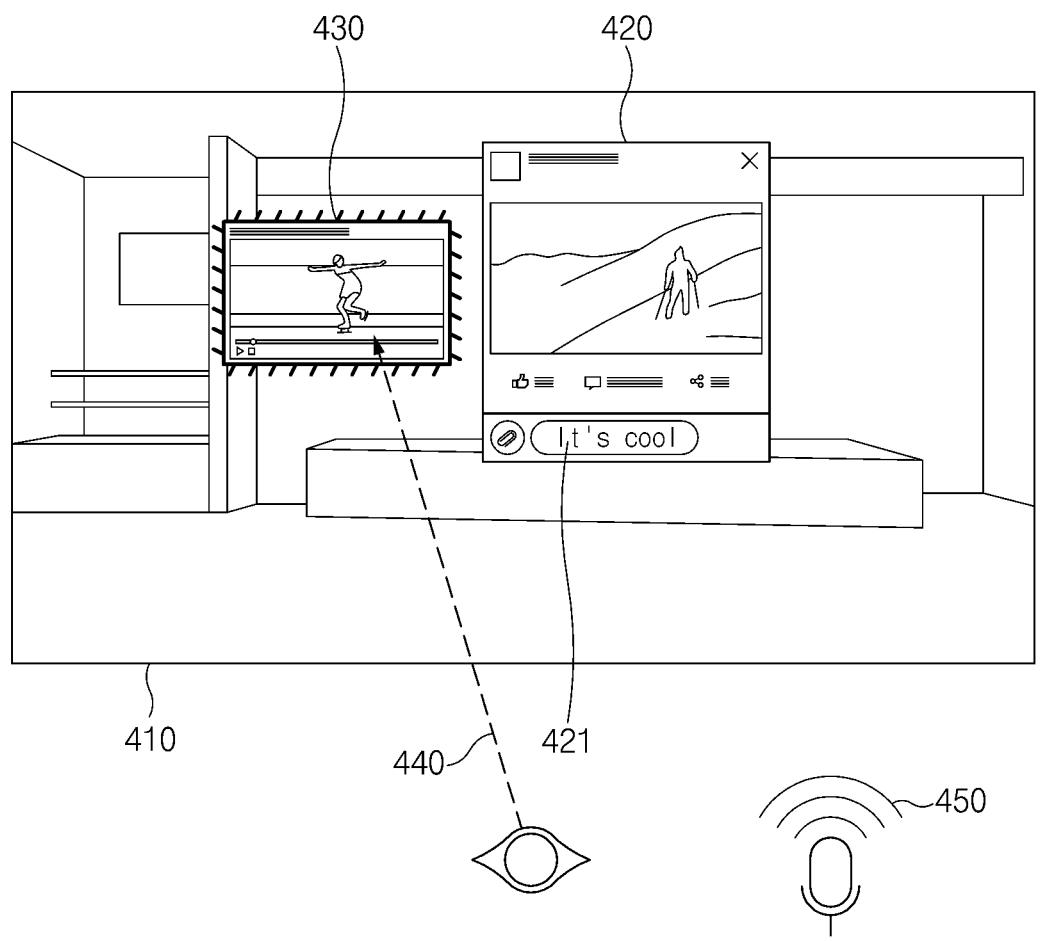
FIG. 4c is a diagram illustrating that another object is activated according to a speech input and a function corresponding to the speech input is performed, according to an embodiment.

FIG. 4a is a diagram illustrating a screen on which a plurality of objects are displayed in a display according to an embodiment, FIG. 4b is a diagram illustrating that text is input to a text input window through a speech input when the gaze of the user is being located at a second object according to an embodiment, and FIG. 4c is a diagram illustrating that another object is activated according to a speech input and a function corresponding to the speech input is performed, according to an embodiment;

As described above, the processor 150 may activate the first object immediately when the gaze of the user is located at a location where the first object is displayed. Such an activation method may cause inconvenience to the user when the user continuously performs input with respect to the selected object. For example, when a text input window is activated as the first object and the gaze of the user is located at a position other than the first object during input of speech, a part of text may not be input to the text input window.

When the gaze of the user is located at the position where the first object is displayed, the processor 150 may activate the first object and maintain the activated state of the first object while an input by the determined method is obtained.

For example, referring to FIG. 4a, because the gaze of the user 440 is located at a text input window 421 of a first UI 420 displayed on a display 410, the processor 150 may activate the text input window 421 as the first object. Even when the gaze of the user 440 is not located at the text input window 421 that is the first object while a speech input 450 that is the determined input method is obtained after the text input window 421 is activated as illustrated in FIG. 4b, the processor 150 may maintain the activated state of the text input window 421.

According to an embodiment, when the gaze of the user is located at a second object different from the first object among the plurality of objects while the activated state of the first object is maintained and the input is an input applicable to the second object, the processor 150 may perform a function corresponding to the input on the second object.

For example, as illustrated in FIG. 4c, when the gaze of the user is located at a second object 430 and the speech input 450 of "Play" is obtained while the text is being input to the text input window 421 by the speech input, the processor 150 may activate the second object 430 and perform a playback function that is a function corresponding to the speech input 450 (assuming that "Play" is an input applicable to the second object).

An example in which a function corresponding to a gesture input is performed and an example in which a function corresponding to a speech input is performed will be described with reference to FIGS. 5a to 6c.

Figure 5A:
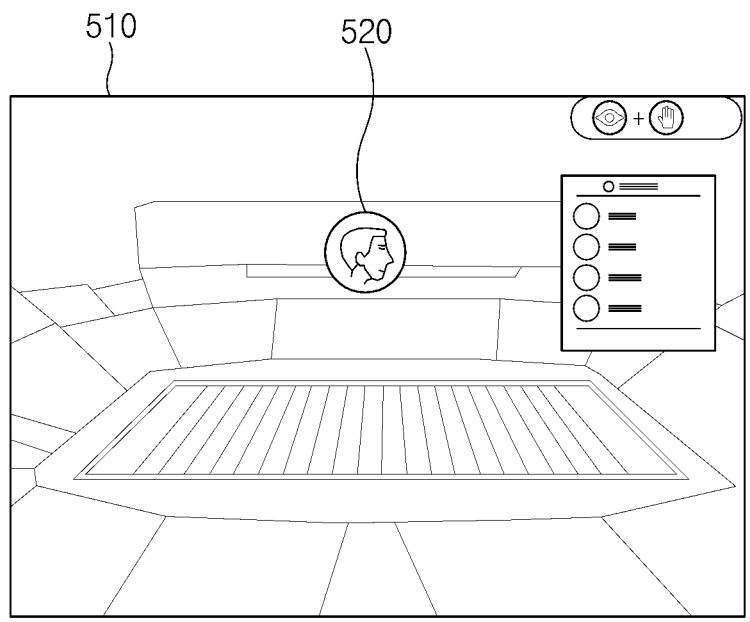
FIGS. 5a to 5c are diagrams illustrating exemplary step-by-step UIs in which a function corresponding to a gesture input is performed, according to an embodiment.
Figure 5B:
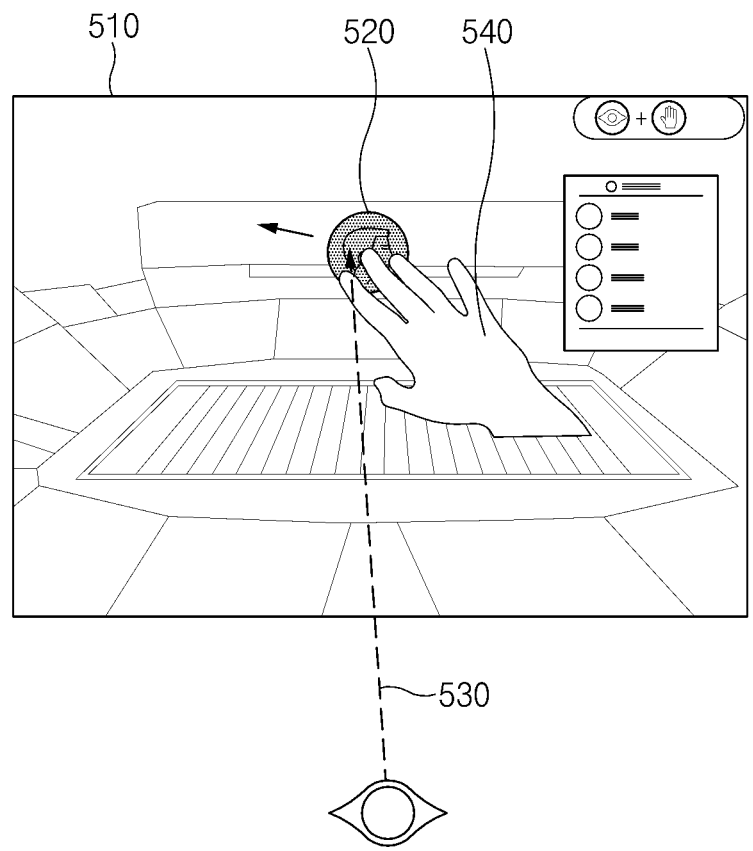
Figure 5C:
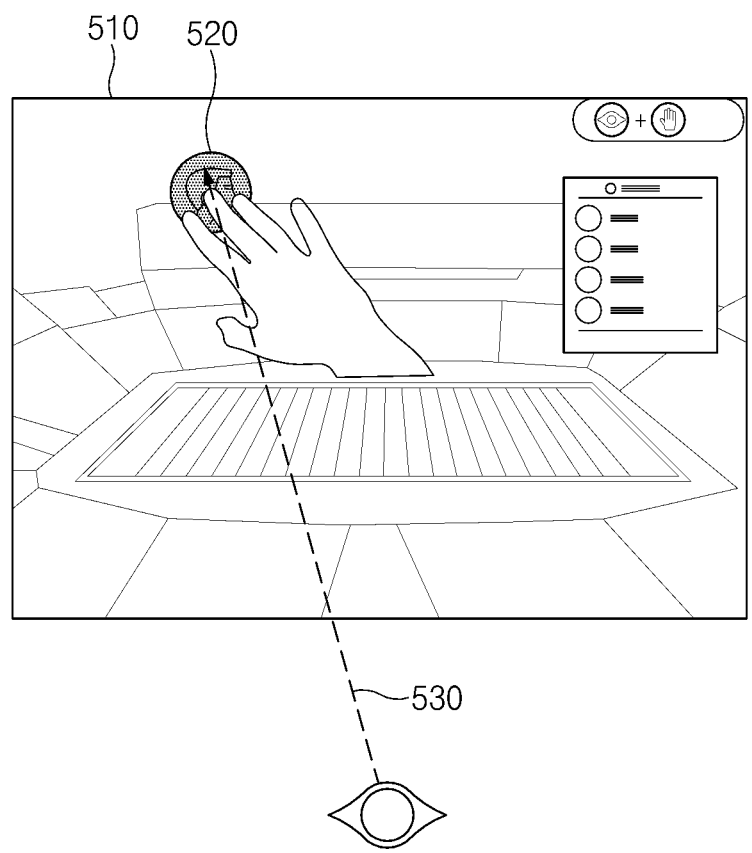

FIGS. 5a to 5c are diagrams illustrating exemplary step-by-step UIs in which a function corresponding to a gesture input is performed, according to an embodiment.

When the name of an athlete is obtained by a speech input, the processor 150 may display a picture of the athlete corresponding to an object 520 of a UI on a display 510 as illustrated in FIG. 5a.

The processor 150 may obtain gaze information of a user and activate the picture of the athlete that is a first object 520 corresponding to gaze information 530, as illustrated in FIG. 5b. In addition, the processor 150 may determine an input method to be a gesture input based on a type of the first object.

The processor 150 may apply a function of a gesture input 540 to move an object to the first object 520 to move the athlete's picture that is the first object 520 as illustrated in FIG. 5c.

Figure 6A:
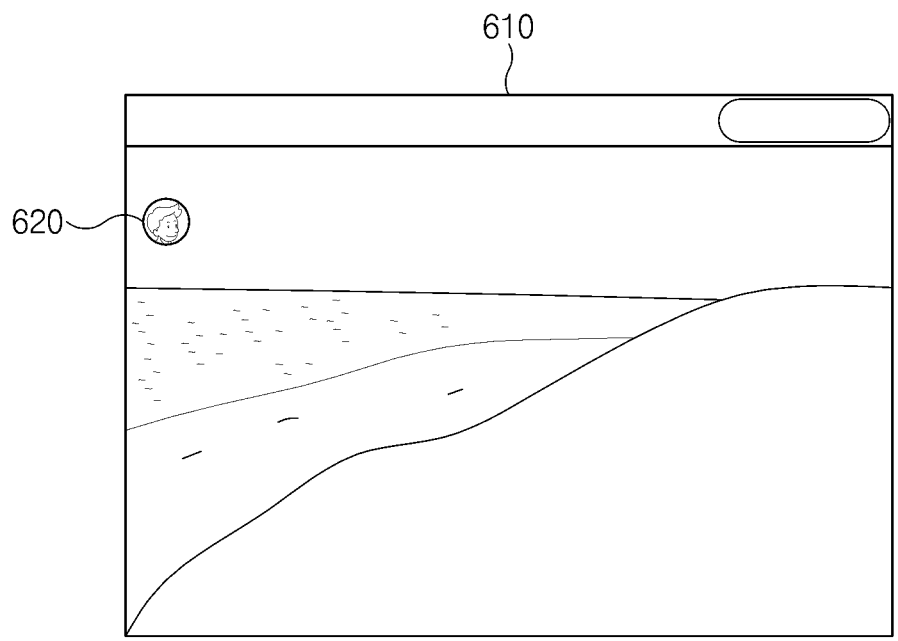
FIGS. 6a to 6c are diagrams illustrating exemplary step-by-step UIs in which a function corresponding to a speech input is performed, according to an embodiment.
Figure 6B:
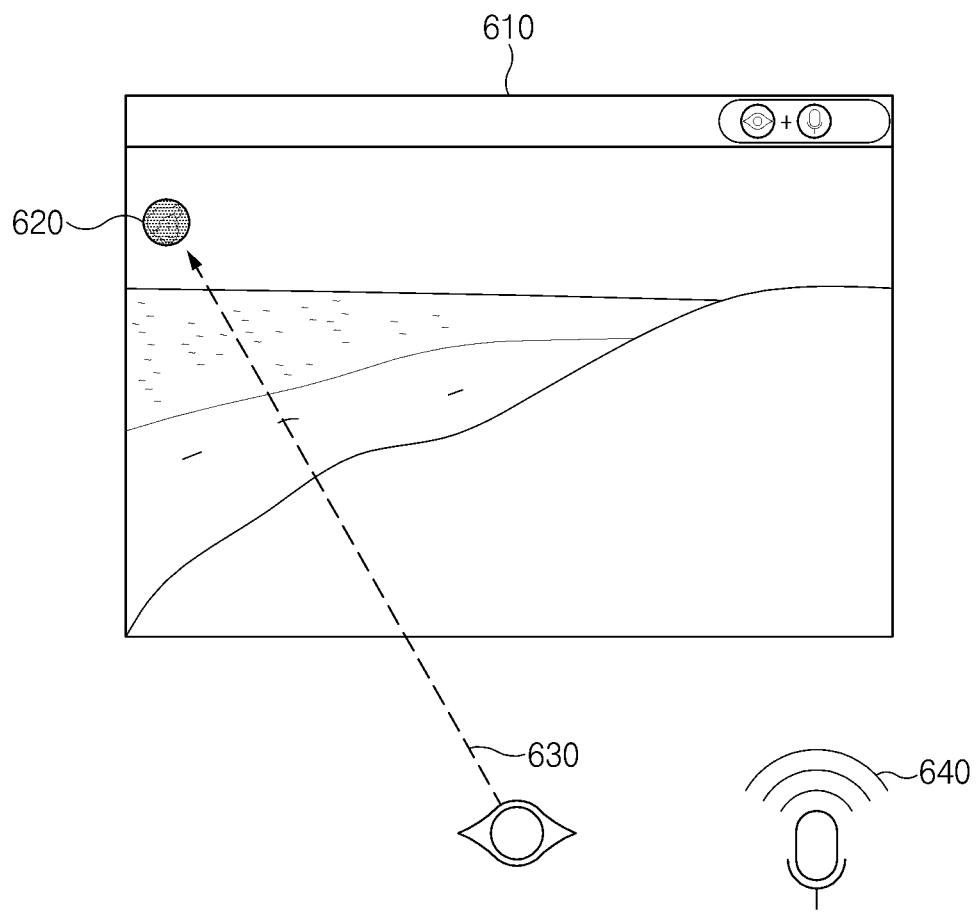
Figure 6C:
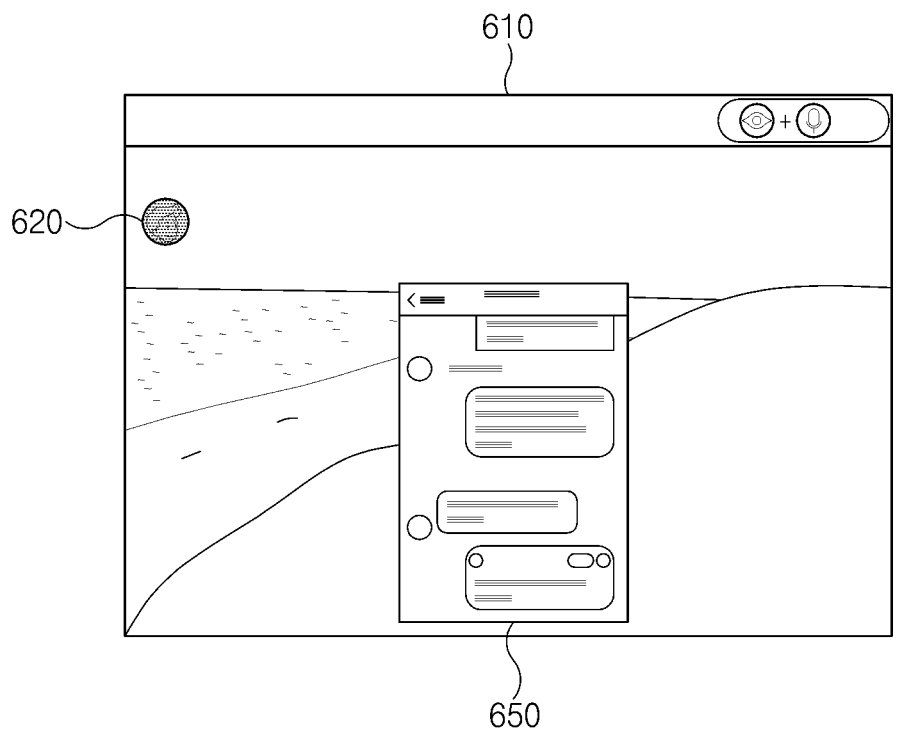

FIGS. 6a to 6c are diagrams illustrating exemplary step-by-step UIs in which a function corresponding to a speech input is performed, according to an embodiment.

When a message is received, the processor 150 may display a picture of a message sender corresponding to an object 620 of a UI on a display 610, as illustrated in FIG. 6a.

The processor 150 may obtain gaze information of a user and activate the picture of the message sender, which is the first object 620 corresponding to the gaze information 630, as illustrated in FIG. 6b. In addition, the processor 150 may determine an input method to be a speech input based on a type of the first object 620.

The processor 150 may perform a function of the speech input 640 to display a received message on the first object to display the received message 650 as illustrated in FIG. 6c.

A device in which the above-described embodiments may be implemented will be described with reference to FIGS. 7a to 8.

Figure 7A:
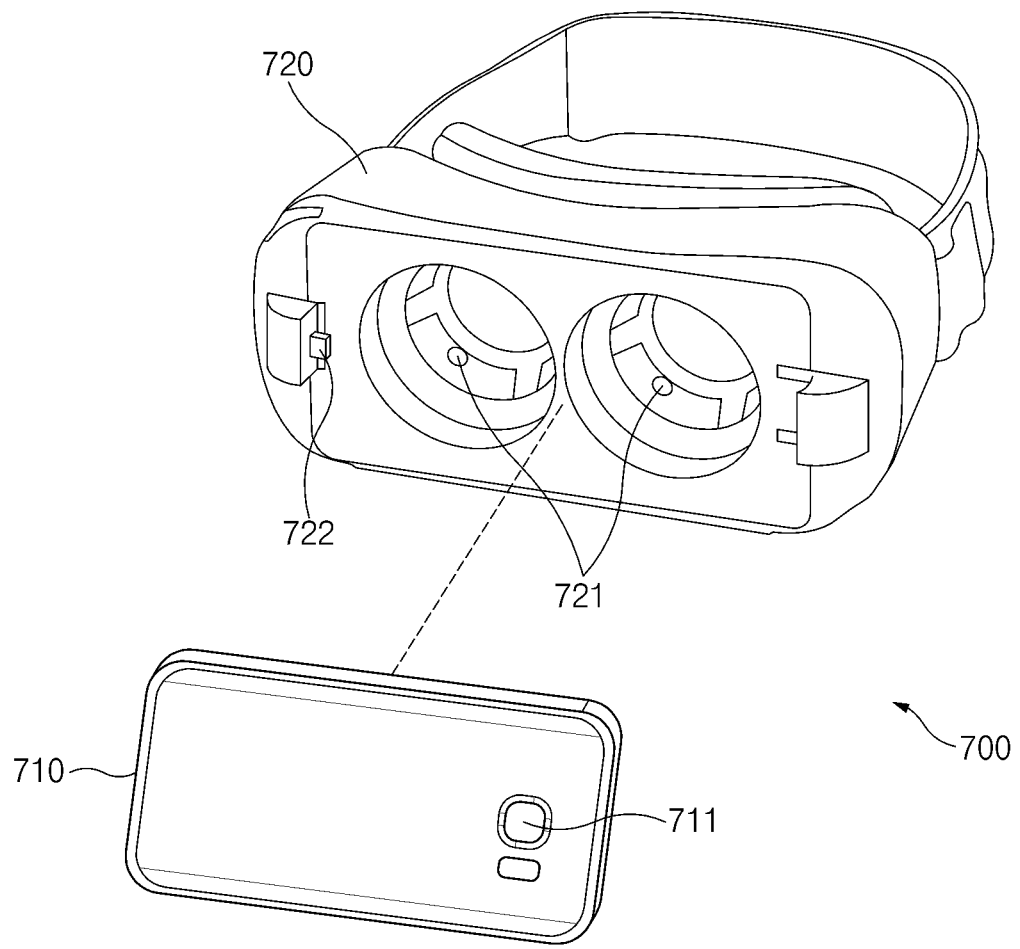
FIG. 7a is a diagram illustrating a head mounted display (HMD) and a rear surface of an electronic device coupled to the HMD and according to an embodiment.
Figure 7B:
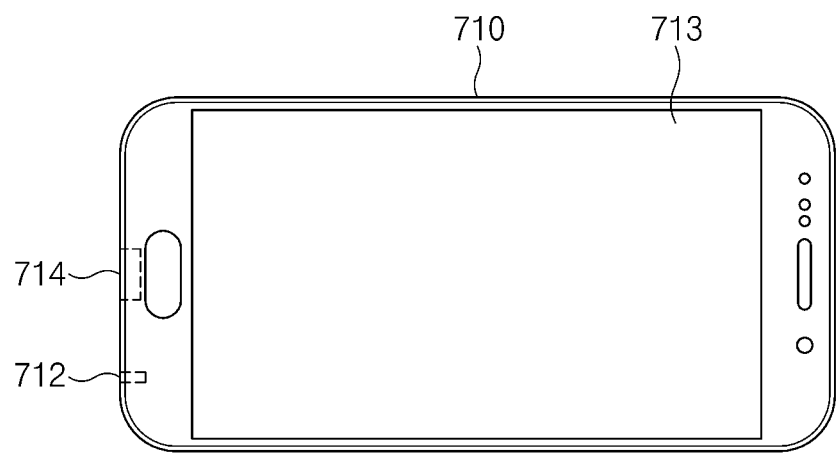
FIG. 7b is a diagram illustrating a front surface of an electronic device coupled to an HMD according to an embodiment.

FIG. 7a is a diagram illustrating a head mounted display (HMD) and a rear surface of an electronic device coupled to the HMD according to an embodiment, and FIG. 7b is a diagram illustrating a front surface of an electronic device coupled to the HMD according to an embodiment.

The disclosure may be implemented with an electronic device 700 that includes both an HMD 720 and a mobile electronic device 710 in FIGS. 7a and 7b and may be implemented with the mobile electronic device 710 coupled to the HMD 720.

The HMD 720 may include a camera 721 and a connector 722 and the mobile electronic device 710 may include a camera 711, a microphone 712, a display 713, a connector 714, and a processor (not illustrated).

The camera 721 of the HMD 720 may correspond to the first camera 111 of FIG. 1.

The camera 711, the microphone 712, the display 713 and the processor of the mobile electronic device 710 may correspond to the second camera 112, the microphone 120, the display 130 and the processor 150 in FIG. 1.

The HMD 720 may be coupled to the mobile electronic device 710 by inserting the connector 722 of the HMD 720 into the connector 714 of the mobile electronic device 710 and the HMD 720 and the mobile electronic device 710 may be functionally connected through the connectors 714 and 722.

Figure 8:
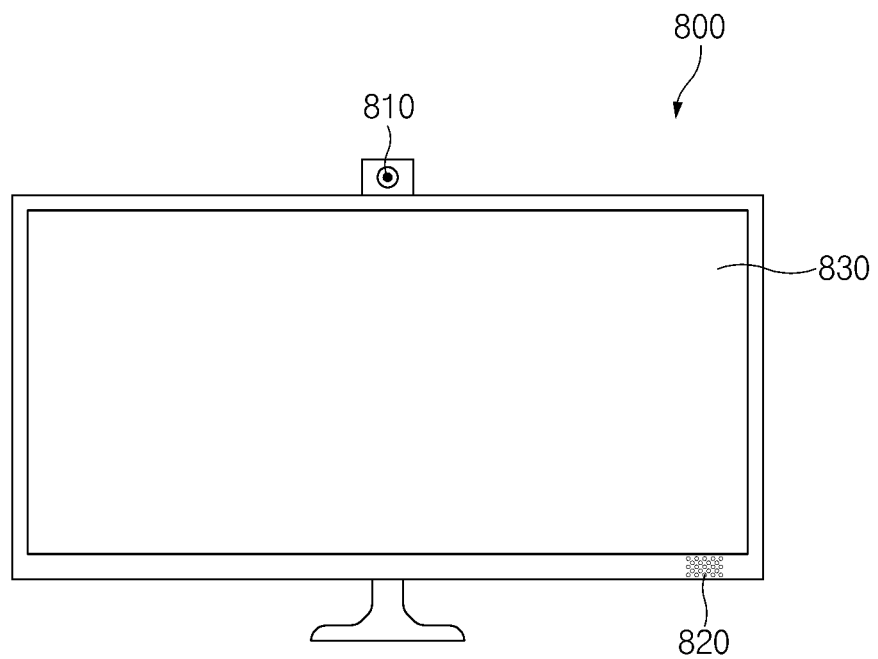
FIG. 8 is a diagram illustrating a display device according to an embodiment.

FIG. 8 is a diagram illustrating a display device 130 according to an embodiment.

Referring to FIG. 8, a display device may include a camera 810, a microphone 820, a display 830, and a processor (not illustrated). The microphone 820, the display 830 and the processor of the display device may respectively correspond to the microphone 120, the display 130 and the processor 150 in FIG. 1.

However, the camera 810 of the display device may correspond to the camera 110 including the first camera 111 and the second camera 112 in FIG. 1 because the camera 810 of the display device is capable of photographing both the user's gaze and gesture.

On the other hand, the disclosure may also be implemented in devices other than the illustrated electronic device, the mobile electronic device coupled to the HMD, and the display device.

For example, when the disclosure is implemented in a vehicle, a head up display (HUD) may correspond to a display, and a camera, a microphone, and a processor may be provided in the vehicle. When the disclosure is implemented in a vehicle, it is possible to perform mode switching of the HUD indicating a running distance, a temperature or momentary fuel consumption or the like, control of content such as music, radio, video or the like, notification of vehicle status issues, and check of related information during driving while a handle is being held in operation.

Figure 9:
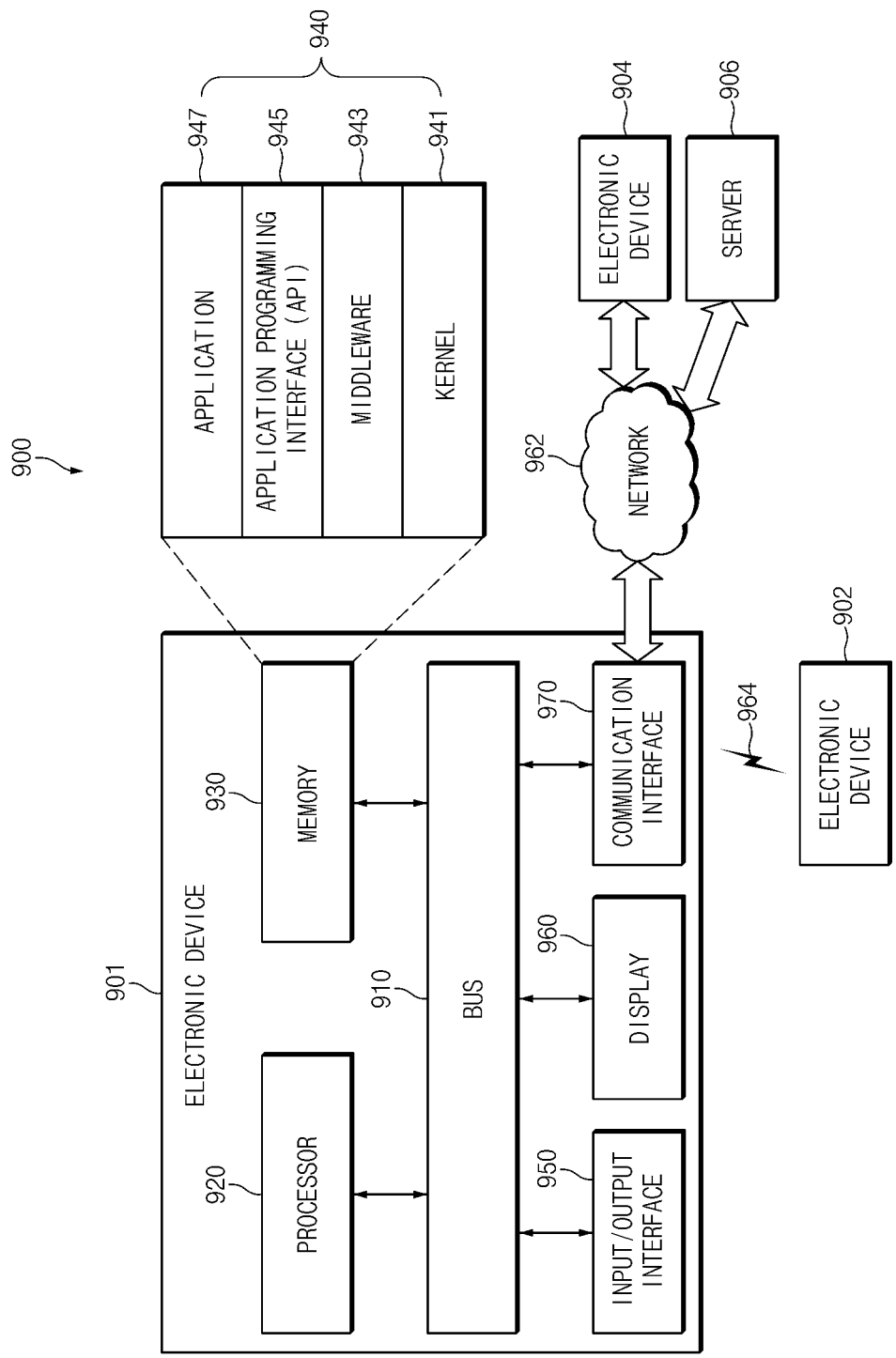
FIG. 9 illustrates an electronic device in a network environment system, according to various embodiments.

FIG. 9 illustrates an electronic device in a network environment system, according to various embodiments.

Referring to FIG. 9, according to various embodiments, an electronic device 901, a first electronic device 902, a second electronic device 904, or a server 906 may be connected each other over a network 962 or a short range communication 964. The electronic device 901 may include a bus 910, a processor 920, a memory 930, an input/output interface 950, a display 960, and a communication interface 970. According to an embodiment, the electronic device 901 may not include at least one of the above-described components or may further include other component(s).

The processor 920, the memory 930, and the display 960 may correspond to the processor 150, the memory 140, and the display 130 of FIG. 1, respectively.

For example, the bus 910 may interconnect the above-described components 910 to 970 and may include a circuit for conveying communications (e.g., a control message and/or data) among the above-described components.

The processor 920 may include one or more of a central processing unit (CPU), an application processor (AP), or a communication processor (CP). For example, the processor 920 may perform an arithmetic operation or data processing associated with control and/or communication of at least other components of the electronic device 901.

The memory 930 may include a volatile and/or nonvolatile memory. For example, the memory 930 may store commands or data associated with at least one other component(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete components of the electronic device 901 so as to control or manage system resources.

The middleware 943 may perform, for example, a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, of an interface which transmits a command or data input from a user or another external device, to other component(s) of the electronic device 901. Furthermore, the input/output interface 950 may output a command or data, received from other component(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 964. The short range communication 964 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 from another device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
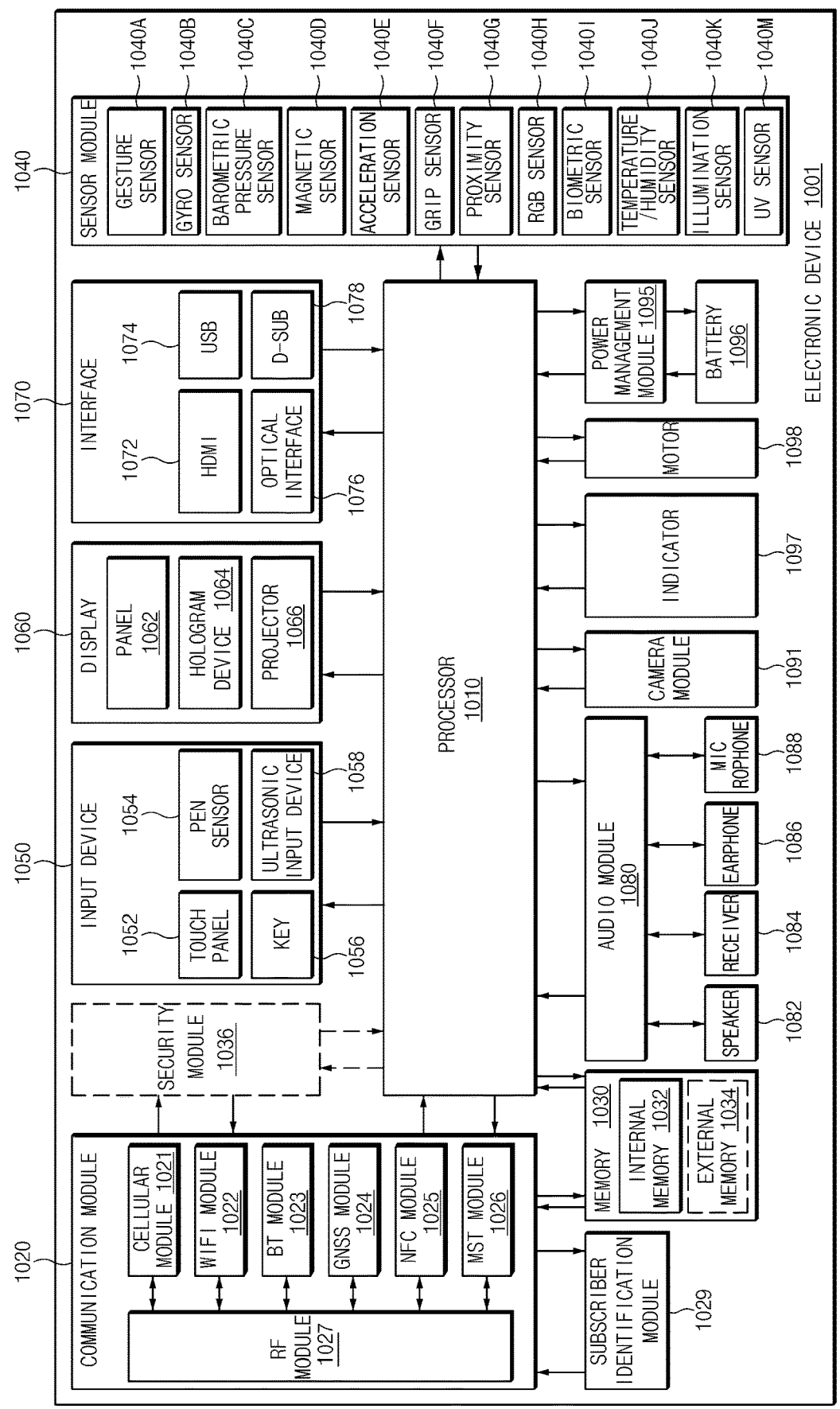
FIG. 10 illustrates a block diagram of an electronic device, according to various embodiments.

FIG. 10 illustrates a block diagram of an electronic device, according to various embodiments.

Referring to FIG. 10, an electronic device 1001 may include, for example, all or a part of the electronic device 901 illustrated in FIG. 9. The electronic device 1001 may include one or more processors (e.g., an application processor (AP)) 1010, a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010, the memory 1030, the display 1060, the microphone 1088, and the camera module 1091 may correspond to the processor 150, the memory 140, the display 130, the microphone 120, and the camera module 110, respectively.

The processor 1010 may drive, for example, an operating system (OS) or an application to control a plurality of hardware or software components connected to the processor 1010 and may process and compute a variety of data. For example, the processor 1010 may be implemented with a System on Chip (SoC). According to an embodiment, the processor 1010 may further include a graphic processing unit (GPU) and/or an image signal processor. The processor 1010 may include at least a part (e.g., a cellular module 1021) of components illustrated in FIG. 10. The processor 1010 may load a command or data, which is received from at least one of other components (e.g., a nonvolatile memory), into a volatile memory and process the loaded command or data. The processor 1010 may store a variety of data in the nonvolatile memory.

The communication module 1020 may be configured the same as or similar to the communication interface 970 of FIG. 9. The communication module 1020 may include the cellular module 1021, a Wi-Fi module 1022, a Bluetooth (BT) module 1023, a GNSS module 1024 (e.g., a GPS module, a Glonass module, a Beidou module, or a Galileo module), a near field communication (NFC) module 1025, a MST module 1026 and a radio frequency (RF) module 1027.

The cellular module 1021 may provide, for example, voice communication, video communication, a character service, an Internet service, or the like over a communication network. According to an embodiment, the cellular module 1021 may perform discrimination and authentication of the electronic device 1001 within a communication network by using the subscriber identification module (e.g., a SIM card) 1029. According to an embodiment, the cellular module 1021 may perform at least a portion of functions that the processor 1010 provides. According to an embodiment, the cellular module 1021 may include a communication processor (CP).

Each of the Wi-Fi module 1022, the BT module 1023, the GNSS module 1024, the NFC module 1025, or the MST module 1026 may include a processor for processing data exchanged through a corresponding module, for example. According to an embodiment, at least a part (e.g., two or more) of the cellular module 1021, the Wi-Fi module 1022, the BT module 1023, the GNSS module 1024, the NFC module 1025, or the MST module 1026 may be included within one Integrated Circuit (IC) or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or a secure digital (SD) card, which is removable, or may include an embedded secure element (eSE) embedded in a fixed chip of the electronic device 1001. Furthermore, the security module 1036 may operate based on an operating system (OS) that is different from the OS of the electronic device 1001. For example, the security module 1036 may operate based on java card open platform (JCOP) OS.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 10401, a temperature/humidity sensor 1040J, an illuminance sensor 1040K, or an UV sensor 1040M. Although not illustrated, additionally or alternatively, the sensor module 1040 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, or a projector 1066. The panel 1062 may be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged in the inside or the outside of the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or alternatively, the interface 1070 may include, for example, a mobile high definition link (MHL) interface, a SD card/multi-media card (MMC) interface, or an infrared data association (IrDA) standard interface.

The audio module 1080 may convert a sound and an electric signal in dual directions. At least a component of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

For example, the camera module 1091 may shoot a still image or a video. According to an embodiment, the camera module 1091 may include at least one or more image sensors (e.g., a front sensor or a rear sensor), a lens, an image signal processor (ISP), or a flash (e.g., an LED or a xenon lamp).

The power management module 1095 may manage, for example, power of the electronic device 1001. According to an embodiment, a power management integrated circuit (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 11:
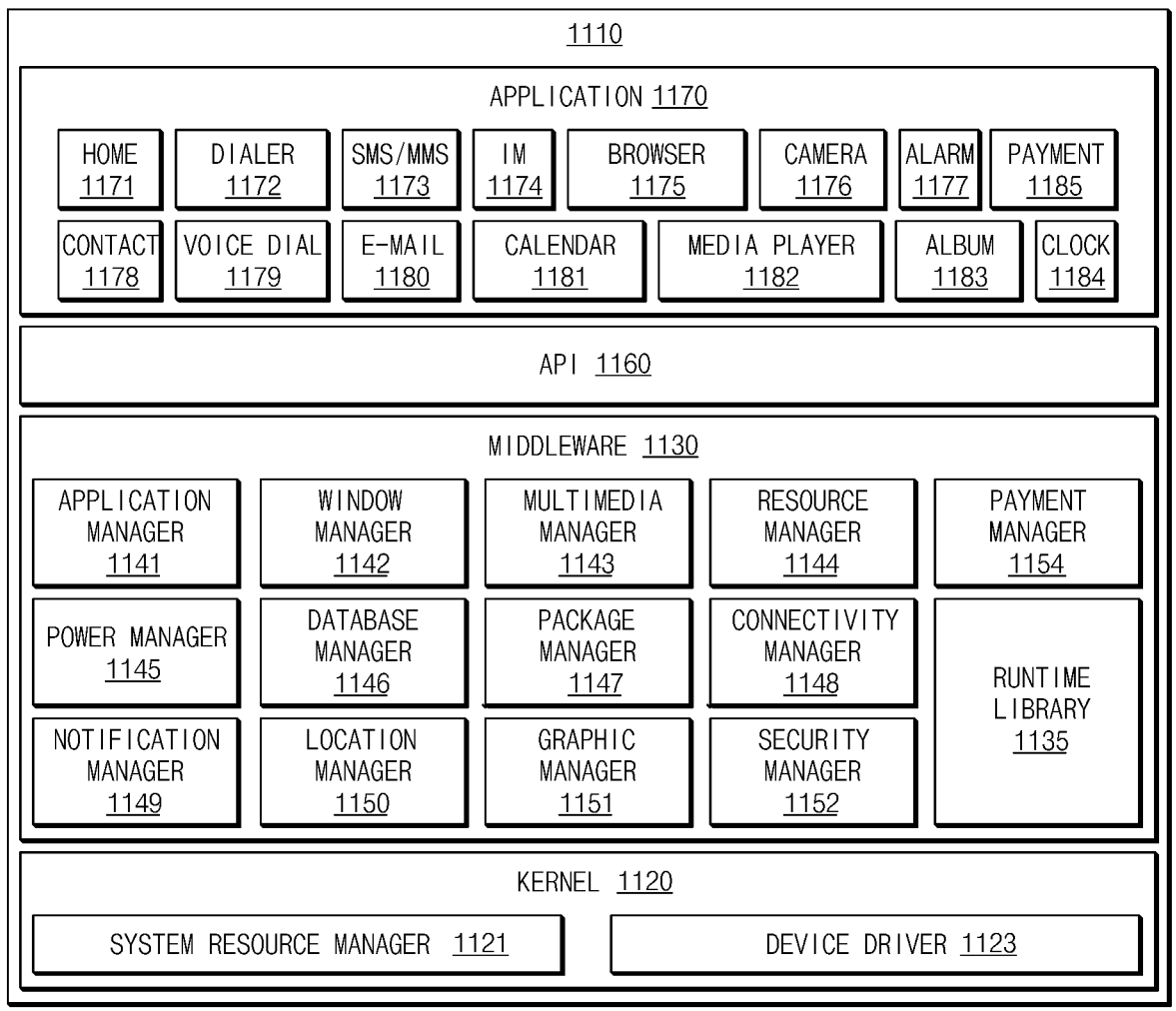
FIG. 11 illustrates a block diagram of a program module, according to various embodiments.

FIG. 11 illustrates a block diagram of a program module, according to various embodiments.

According to an embodiment, a program module 1110 (e.g., the program 940) may include an operating system (OS) to control resources associated with an electronic device (e.g., the electronic device 901), and/or diverse applications (e.g., the application program 947) driven on the OS. The OS may be, for example, Android, iOS, Windows, Symbian, or Tizen.

The program module 1110 may include a kernel 1120, a middleware 1130, an application programming interface (API) 1160, and/or an application 1170. At least a portion of the program module 1110 may be preloaded on an electronic device or may be downloadable from an external electronic device (e.g., the first electronic device 902, the second electronic device 904, the server 906, or the like).

The kernel 1120 (e.g., the kernel 941) may include, for example, a system resource manager 1121 or a device driver 1123. The system resource manager 1121 may perform control, allocation, or retrieval of system resources. According to an embodiment, the system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphic user interface (GUI) resource that is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or Bluetooth. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security, user authentication, or the like. According to an embodiment, in the case where an electronic device (e.g., the electronic device 901) includes a telephony function, the middleware 1130 may further include a telephony manager for managing a voice or video call function of the electronic device.

The middleware 1130 may include a middleware module that combines diverse functions of the above-described components. The middleware 1130 may provide a module specialized to each OS kind to provide differentiated functions. Additionally, the middleware 1130 may dynamically remove a part of the preexisting components or may add new components thereto.

The API 1160 (e.g., the API 945) may be, for example, a set of programming functions and may be provided with a configuration that is variable depending on an OS. For example, in the case where an OS is Android or iOS, it may provide one API set per platform. In the case where an OS is Tizen, it may provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, or a timepiece 1184, or for offering health care (e.g., measuring an exercise quantity, blood sugar, or the like) or environment information (e.g., information of barometric pressure, humidity, temperature, or the like).

According to an embodiment, the application 1170 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1170 may include an application (e.g., a health care application of a mobile medical device) that is assigned in accordance with an attribute of an external electronic device. According to an embodiment, the application 1170 may include an application that is received from an external electronic device (e.g., the first electronic device 902, the second electronic device 904, or the server 906). According to an embodiment, the application 1170 may include a preloaded application or a third party application that is downloadable from a server. The names of components of the program module 1110 according to the embodiment may be modifiable depending on kinds of operating systems.

According to various embodiments, at least a portion of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first camera and a second camera;
a microphone;
a display; and
a processor electrically connected to the first camera, the second camera, the microphone, and the display,
wherein the processor is configured to:
display a user interface (UI) including a first object and a second object on the display,
recognize a gaze of a user using the first camera,
activate the first object corresponding to gaze information,
determine a type of an activated first object,
select at least one of input methods based on the determined type of the activated first object, among a gesture input method using the second camera and a speech input method using the microphone, and
receive an input from the user by the selected at least one of input methods,
wherein, when the input is received by the speech input method, the processor is configured to:
when the gaze of the user is located at the first object while receiving the speech input, perform a first function corresponding to the input on the first object, while an activated state of the first object is maintained,
when the gaze of the user is located at the second object and a specified speech input included in the input is recognized while receiving the input by the speech input method, activate the second object, and
perform a second function corresponding to the specified speech input on the second object while the activated first object and the activated second object are displayed on the display.

2. The electronic device of claim 1, wherein the processor is configured to activate the first object when -the gaze of the user located at a position where the first object is displayed.

3. The electronic device of claim 1, wherein the processor is configured to activate the first object when the user's gaze is kept on a position where the first object is displayed for a predetermined time or more.

4. The electronic device of claim 1, wherein the processor is configured to,
activate the first object when the gaze of the user is located at a position where the first object is displayed, and
maintain the activated state of the first object while the input is obtained by the selected at least one of input methods.

5. The electronic device of claim 1, wherein the processor is configured to,
perform the first function corresponding to the input on the first object, when the selected at least one of input methods is the gesture input method using the input that passes by the gaze of the user.

6. The electronic device of claim 1, wherein the processor is configured to,
select the speech input method using the speech input obtained from the microphone when the determined type of the activated first object is an character input type or an execution input type,
select the gesture input method using a gesture input obtained from the second camera when the determined type of the activated first object is a selection input type or an operation input type.

7. A mobile electronic device coupled to a head mounted display (HMD) including a first camera and a microphone, comprising:
a second camera;
a display; and
a processor functionally connected to the first camera and the microphone and electrically connected to the second camera and the display,
wherein the processor is configured to:
display a user interface (UI) including a first object and a second object on the display,
recognize a gaze of a user using the first camera,
activate the first object corresponding to gaze information,
determine a type of an activated first object,
select at least one of input methods based on the determined type of the activated first object, among a gesture input method using the second camera and a speech input method using the microphone, and
receive an input from the user by the selected at least one of input methods.
wherein, when the input is received by the speech input method, the processor is configured to:
when the gaze of the user is located at the first object while receiving the speech input, perform a first function corresponding to the input on the first object, while an activated state of the first object is maintained,
when the gaze of the user is located at the second object and a specified speech input included in the input is recognized while receiving the input by the speech input method, activate the second object, and
perform a second function corresponding to the specified speech input on the second object while the activated first object and the activated second object are displayed on the display.

8. The mobile electronic device of claim 7, wherein the processor is configured to activate the first object when the gaze of the user is located at a position where the first object is displayed.

9. The mobile electronic device of claim 7, wherein the processor is configured to activate the first object when the user's gaze is kept on a position where the first object is displayed for a predetermined time or more.

10. The mobile electronic device of claim 7, wherein the processor is configured to,
activate the first object when the gaze of the user is located at a position where the first object is displayed, and
maintain the activated state of the first object while the input is obtained by the selected at least one of input methods.

11. The mobile electronic device of claim 7, wherein the processor is configured to,
when a noise above a reference value occurs in the speech input, select a gesture input method using the gesture input when the determined type of the activated first object is one of a selection input type, an operation input type, character input type or execution input type.

12. The mobile electronic device of claim 7, wherein the processor is configured to,
perform the first function corresponding to the input on the first object, when the selected at least one of input method is the gesture input method using the input that passes by the gaze of the user.

13. The mobile electronic device of claim 7, wherein the processor is configured to,
select a speech input method using the speech input obtained from the microphone when the determined type of the activated first object is an character input type or an execution input type,
select a gesture input method using a gesture input obtained from the second camera when the determined type of the activated first object is a selection input type or an operation input type.

* * * * *